(12) United States Patent (10) Patent No.: US 11,970,249 B2
Kim (45) Date of Patent: Apr. 30, 2024

(54) FLOATING-TYPE AQUATIC SUPPORT APPARATUS

(71) Applicant: Su Hwan Kim, Changwon-si (KR)

(72) Inventor: Su Hwan Kim, Changwon-si (KR)

( * ) Notice: Subject to any disclaimer, the term of this patent is extended or adjusted under 35 U.S.C. 154(b) by 385 days.

(21) Appl. No.: 17/602,647

(22) PCT Filed: Jan. 3, 2020

(86) PCT No.: PCT/KR2020/000100
§ 371 (c)(1),
(2) Date: Oct. 8, 2021

(87) PCT Pub. No.: WO2020/209483
PCT Pub. Date: Oct. 15, 2020

(65) Prior Publication Data
US 2022/0161905 A1 May 26, 2022

(30) Foreign Application Priority Data
Apr. 8, 2019 (KR) .................. 10-2019-0040943

(51) Int. Cl.
*B63B 35/44* (2006.01)
*F03D 13/20* (2016.01)
*F03D 13/25* (2016.01)

(52) U.S. Cl.
CPC .............. *B63B 35/44* (2013.01); *F03D 13/20* (2016.05); *B63B 2209/18* (2013.01); *B63B 2209/20* (2013.01); *F03D 13/25* (2016.05); *F05B 2240/93* (2013.01); *F05B 2240/95* (2013.01)

(58) Field of Classification Search
CPC ..... B63B 35/00; B63B 35/44; B63B 2209/18; B63B 2209/20; F03D 13/00; F03D 13/20; F03D 13/25; F05B 2240/93
USPC ........................................................ 114/56.1
See application file for complete search history.

(56) References Cited

FOREIGN PATENT DOCUMENTS

| JP | 2003-301837 A | 10/2003 |
|---|---|---|
| JP | 2009-511783 A | 3/2009 |
| JP | 2016-109126 A | 6/2016 |
| KR | 10-2013-0058250 A | 6/2013 |
| KR | 10-2017-0051204 A | 5/2017 |
| KR | 10-2017-0108900 A | 9/2017 |
| KR | 10-1857949 B1 | 5/2018 |

OTHER PUBLICATIONS

International Search Report of PCT/KR2020/000100 published on Oct. 15, 2020.
Written opinion of PCT/KR2020/000100 published on Oct. 15, 2020.

*Primary Examiner* — Lars A Olson

(57) ABSTRACT

Provided is a floating-type on-water support apparatus including: a ball; a floating unit including a floating part, wherein the floating part has an upper plate supporting the ball so that the ball is rotatable, an interior formed to be hollow, and a lower plate provided with a spherical surface portion and floats on water; a support rod coupled to the ball and having one end exposed above the water so that a structure is installable thereon and the other end heavier than the one end so as to stand vertically to be accommodated in the floating part; and a base unit having one end installed on a lower portion of the support rod to support the support rod and the other end in roll contact with the spherical surface portion.

13 Claims, 15 Drawing Sheets

FLOATING-TYPE AQUATIC SUPPORT APPARATUS

CROSS-REFERENCE TO RELATED APPLICATION

This application claims priority to and the benefit of Korean Patent Application No. 2019-0040943, filed on Apr. 8, 2019, the disclosure of which is incorporated herein h reference in its entirety.

TECHNICAL FIELD

The present invention relates to a floating-type on-water support apparatus, and more specifically, to a floating-type on-water support apparatus configured to maintain horizontality of a heavy offshore structure and support the heavy offshore structure.

BACKGROUND OF THE INVENTION

A floating-type on-water support apparatus, which is disclosed in Public Patent No. 10-2017-0108900 and Registered Patent No. 10-1857949 and on which a wind power generator or another structure can be installed, is developed in order to install the wind power generator on the sea because a magnitude of wind is not large due to friction with the ground of the land.

The above-disclosed floating-type on-water support apparatus includes a ball, a floating part, and a support rod. The floating part floats on water and supports the ball. The support rod is coupled to the ball, and one end of the support rod is heavier than the other end thereof. Accordingly, the support rod stands vertically. A wind power generator or another structure may be installed on one end of the support rod.

RELATED ART DOCUMENT

Patent Document

Publication Patent No. 10-2017-0108900 (Publication Date: Sep. 27, 2017)
Patent No. 10-1857949 (Registration Date: May 9, 2018)
Publication Patent No. 10-2017-0051704 (Publication Date: May 11, 2017)

PROBLEMS TO BE SOLVED

In the case of a disclosed conventional floating-type on-water support apparatus, a load of a support rod is focused on a portion which supports a ball of a floating part. Accordingly, there is a problem in that the portion supporting the ball of the floating part may not withstand the load and may be damaged.

In addition, in the case of the disclosed conventional floating-type on-water support apparatus, the support rod n coupled to the ball. In this case, since the ball is supported by the floating part, the ball may be rotated. Accordingly, the support rod may also be rotated about a central axis thereof. In this case, when a wind power generator is installed on the support rod, the wind power generator may be rotated about the central axis. Then, since blades of the wind power generator are not directed to face the wind, there is a problem in that a power generation quantity is reduced.

The present invention is directed to providing a floating-type on-water support apparatus allowing a floating part which supports a ball to be prevented from being damaged.

In addition, the present invention is also directed to providing a floating-type on-water support apparatus allowing a support rod, which is configured to support a structure, to be prevented from being rotated about an axis of the support rod even when the support rod may be rotated about a ball.

SUMMARY OF THE INVENTION

According to an aspect of the present invention, there is provided a floating type on-water support apparatus including a ball, a floating unit, a support rod, and a base unit. The floating unit includes a floating part, wherein the floating part has an upper plate supporting the ball so that the ball is rotatable, an interior formed to be hollow, and a lower plate provided with a spherical surface portion and floats on water. One end of the support rod is exposed above the water so that a structure is installable thereon and the other end thereof is heavier than the one end so as to stand vertically to be accommodated in the floating part, and the support rod is coupled to the ball. One end of the base unit is installed on a lower portion of the support rod to support the support rod and the other end thereof is in roll contact with the spherical surface portion.

According to another aspect of the present invention, there is provided a floating-type on-water support apparatus including a ball, a floating unit, a support rod, and a center pendulum. The floating unit includes a floating part, wherein the floating part has an upper plate supporting the ball so that the ball is rotatable, an interior formed to be hollow, and a lower plate provided with a spherical surface portion and floats on water. One end of a support rod is exposed above the water so that a structure is installable thereon and the other end thereof is coupled to the hall to stand vertically and be accommodated in the floating part. The center pendulum is positioned to be rolled on the spherical surface portion to press a lower end of the support rod so as to allow the support rod to stand.

The lower end of the support rod may surround an upper portion of the center pendulum so that the center pendulum is not separated from the support rod.

The support rod may be supported by the center pendulum using a bearing.

The support rod may be slidably coupled to pass through the ball.

A guide groove may be formed in the ball along a circumferential surface passing through the support rod. In this case, the floating unit further may include a restriction protrusion fitted into the guide groove to restrict rotation of the hall about an axis of the support rod.

The floating unit may further include a fixing member used to install the restriction protrusion on the floating part.

The ball may further include a fixing groove formed in the guide groove at two sides of the ban to be perpendicular to a central axis of the support rod. In this case, the restriction protrusion may be coupled to the fixing member to be moved toward or away from the fixing member in a radius direction of the hall so as to be fitted into the fixing groove.

The fixing member may include a moving plate and a fixing frame. The moving plate may be coupled to the restriction protrusion so that the restriction protrusion is moved forward or rearward when the restriction protrusion is rotated and may be bent in a circumferential direction of the ball. The fixing frame may be coupled to the floating part to restrict the moving plate to slide only within a predetermined distance in the circumferential direction of the ball.

The fixing member may further include a clamp coupled to the fixing frame to press the moving plate so as to fix sliding of the moving plate.

According to still another aspect of the present invention, there is provided a floating-type on-water support apparatus including a floating unit, a support unit, a base unit, and an installation base. The floating unit includes a floating part of which an interior is formed to be hollow so that the floating part floats on water and in which a spherical surface portion is formed on a lower surface in the interior. The support unit includes an upper support rod coupled to an upper portion of the floating part and a lower support rod of which one end is coupled to the upper support rod using a universal joint and the other end is heavier than the one end to stand vertically and is accommodated in the floating part. One end of the base unit is installed on the other end of the lower support rod to support the lower support rod and the other end thereof is in roll contact with the spherical surface portion. The installation base is exposed above the floating unit so that a structure is installable on one end thereof and is coupled to the lower support rod.

The floating-type on-water support apparatus may further include a blocking cover coupled to the floating part to prevent water on which the floating unit floats, from being introduced into the ball.

According to yet another aspect of the present invention, there is provided a floating-type on-water support apparatus including a floating unit, a support unit, a center pendulum, and an installation base. The floating unit includes a floating part of which an interior is formed to be hollow so that the floating part floats on water and in which a spherical surface portion is formed on a lower surface in the interior. The support unit includes an upper support rod coupled to an upper portion of the floating part and a lower support rod coupled to the upper support rod using a universal joint and is accommodated in the floating part. The center pendulum is positioned to be rolled on the spherical surface portion to press a lower end of the lower support rod so as to allow the lower support rod to stand. The installation base is exposed above the floating unit so that a structure is installed one end thereof, and coupled to the lower support rod.

The lower support rod may surround an upper portion of the center pendulum so that the center pendulum is not separated from the lower support rod.

The lower support rod may be supported by the center pendulum using a bearing.

The upper support rod may be coupled to an upper portion of the floating part to be vertically slidable.

In addition, the floating-type on-water support apparatus may further include a blocking cover coupled to the floating part to prevent water from being introduced into the universal joint.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF INVENTION

Figure 1:
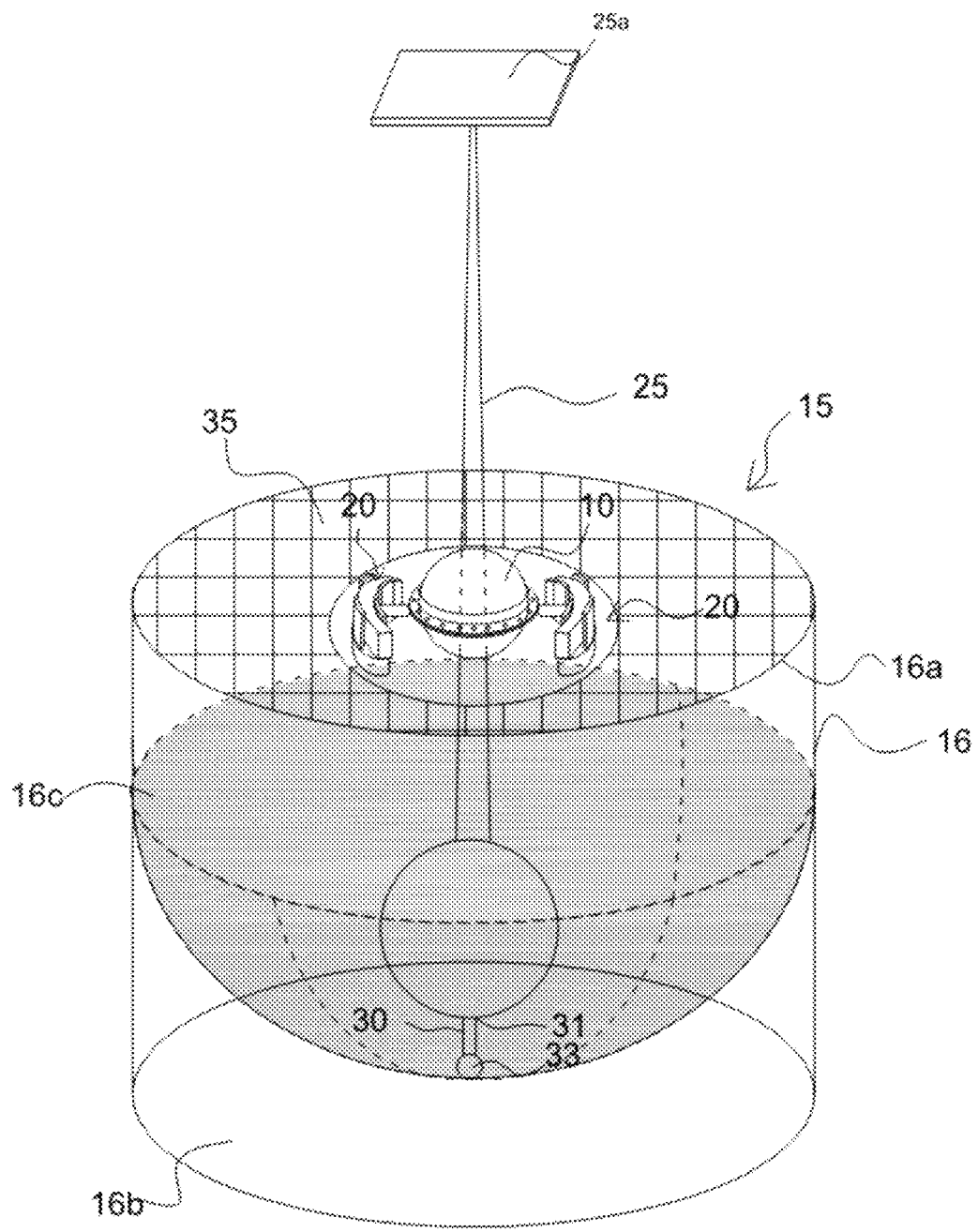
FIG. 1 is a conceptual view illustrating a floating-type on-water support apparatus according to one embodiment of the present invention.
Figure 2:
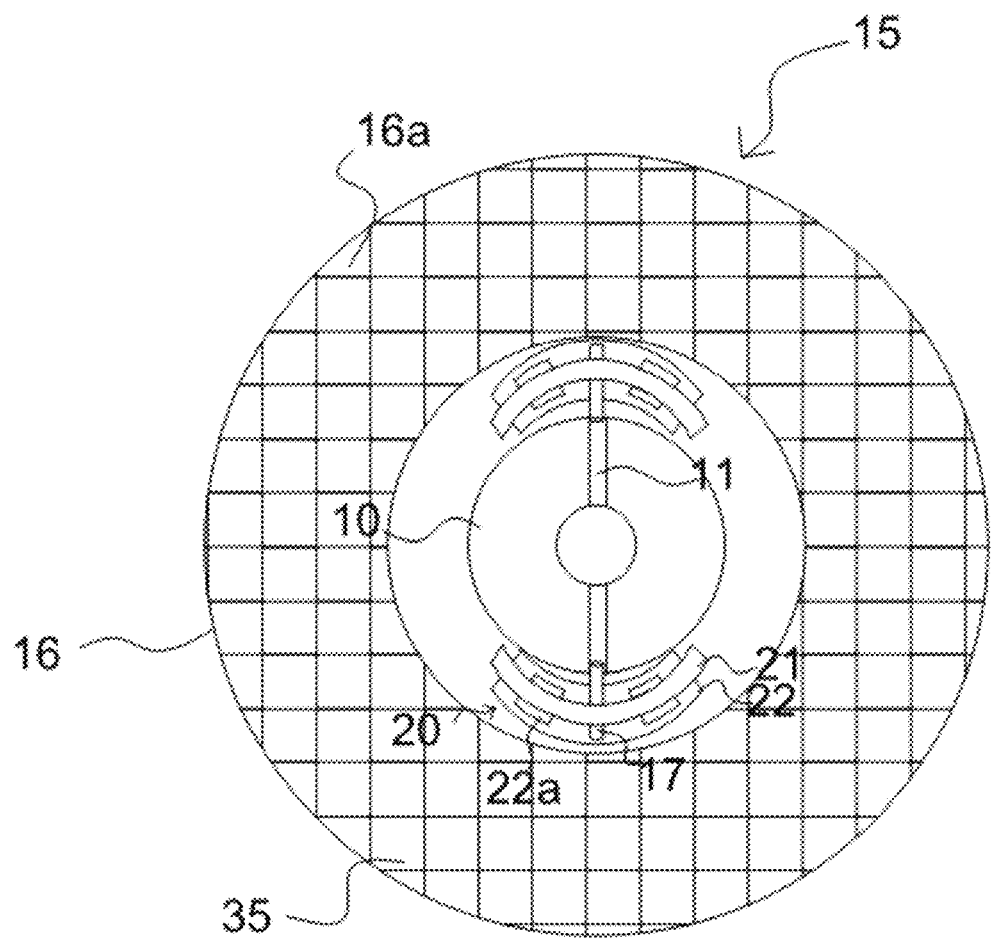
FIG. 2 is a plan view illustrating, the embodiment of FIG. 1.
Figure 3:
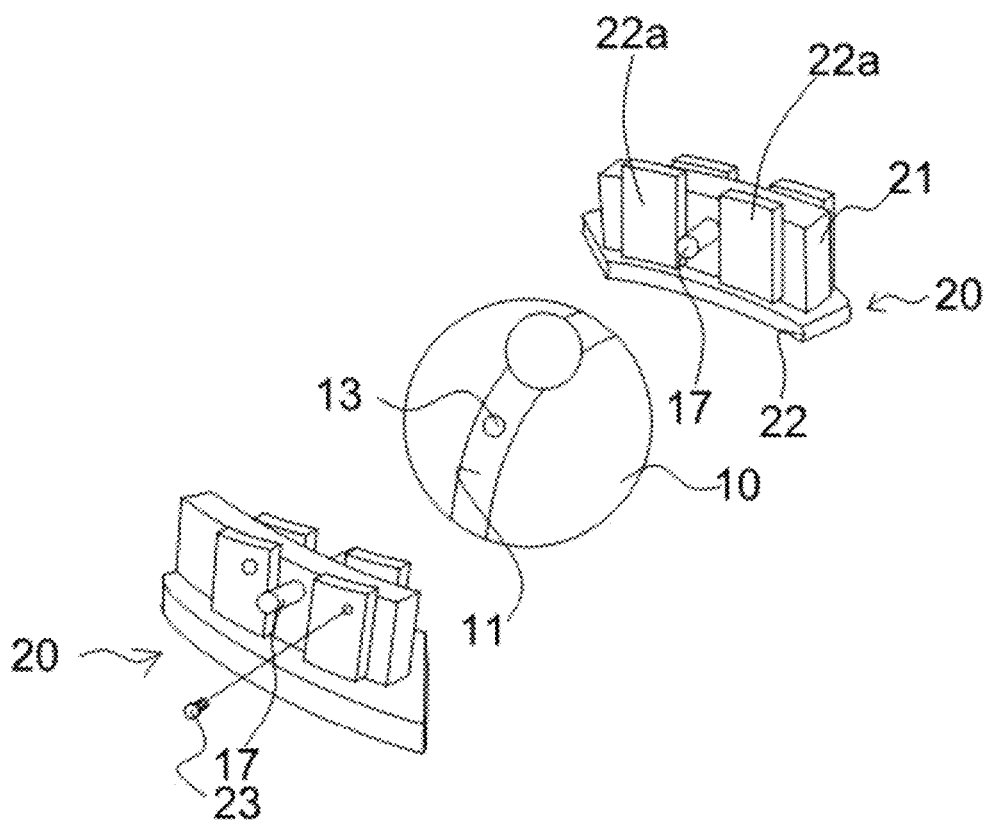
FIG. 3 is a conceptual view illustrating a ball and a fixing member of the embodiment of FIG. 1.
Figure 4:
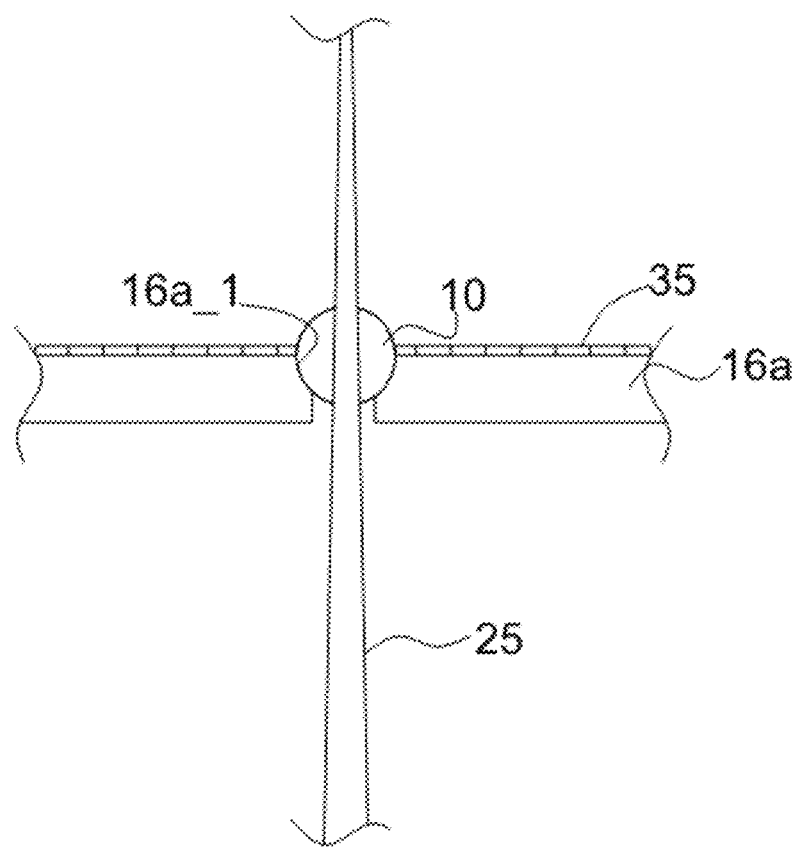
FIG. 4 is a cross-sectional view illustrating a floating unit of the embodiment of FIG. 1.

One embodiment of a floating-type on-water support apparatus according to the present invention will be described with reference to FIGS. 1 to 5.

The floating-type on-water support apparatus according to the present invention includes a ball 10, a floating unit 15, a support rod 25, a base unit 30, and a solar panel 35.

A guide groove 11 and fixing grooves 13 are formed in the ball 10. The guide groove 11 is formed along a circumferential surface of a virtual crass section passing through a center of the ball 10. That is, the guide groove 11 is formed along the circumferential surface in which a diameter of the ball 10 is defined. In addition, the fixing grooves 13 are formed in the guide groove 11 at two sides, which are opposite to each other, of the ball 10 in directions toward the center of the ball 10.

The support rod 25 is coupled to the ball 10, and since the support rod 25 should stand vertically so that one end 25a of the support rod 25 is moved upward and the other end thereof is moved downward, the other end is formed to be heavier than the one end 25a. In this case, a structure such as a wind power generator may be installed on the one end 25a of the support rod 25. When the support rod 25 is coupled to the ball 10, the support rod 25 is coupled to pass through the guide groove 11 and the center of the ball 10 to be perpendicular to the fixing grooves 13. In order to change a weight of the support rod 25, a fluid may be injected into or is discharged from the support rod 25 as in the conventional invention.

The floating unit 15 includes a floating part 16, restriction protrusions 17, and fixing members 20.

The floating part 16 floats on water, and an interior of the floating part 16 is formed to be hollow to accommodate the other end of the support rod 25. An upper plate 16a of the floating part 16 supports the ball so that the ball 10 is rotatable. Accordingly, a ball accommodation part 16a_1 for accommodating and supporting the ball 10 is formed in the upper plate 16a. That is, the ball 10 may be seated and rotated in the ball accommodation part 16a_1. In addition, a spherical surface portion 16c is provided on a lower plate 16b.

One end of the restriction protrusion 17 is fitted into the guide groove 11 so that the ball 10 is not rotated about an axis of the support rod 25. In this case, a screw is formed on the other end of the restriction protrusion 17 so that the restriction protrusion 17 is moved forward or rearward in the fixing member 20.

The fixing members 20 serve to install the restriction protrusions 17 on the floating part 15. To this end, the fixing members 20 include moving plates 21, fixing frames 22, and clamps 23.

The moving plate 21 is screw-coupled to the other end of the restriction protrusion 17 so that the restriction protrusion 17 is moved forward or rearward when the restriction protrusion 17 is rotated and is formed to be bent in a circumferential direction of the ball 10.

The fixing frame 22 is coupled to the upper plate 16a of the floating part 16 so that the moving plate 21 is slidable within a predetermined distance in a curvature direction of the moving plate 21. To this end, the fixing frame 22 guides the moving plate 21 to slide, and in this case, collision bars 22a are formed to be spaced apart from each other by the distance so that the moving plate 21 collides with the restriction protrusion 17 after sliding the predetermined distance. That is, the restriction protrusion 17 may slide only between the collision bars 22a spaced apart from each other by the predetermined distance. Accordingly, the moving plate 21 is also slidable only within the predetermined distance like the collision bar 22a.

The clamp 23 restricts sliding of the moving plate 21. In some cases, the moving plate 21 should not slide and the moving plate 21 should be fixed to not slide. In this case, the sliding of the moving plate 21 may be restricted by the clamp 23. To this end, the clamp 23 is coupled to the fixing frame 22 to press the moving plate 21 when the clamp 23 is coupled to the fixing frame 22. In the case of the present embodiment, the clamp 23 is screw-coupled to the fixing frame 22 to press the moving plate 21.

One end 31 of the base unit 30 may be installed on a lower portion of the support rod 25 so that the lower plate 16b may support the support rod 25, and the other end 33 thereof is in contact with the spherical surface portion 16c. In this case, the other end 33 of the base unit 30 is in contact with the spherical surface portion 16c to be rollable thereon. Accordingly, the other end 33 may be implemented as a wheel, a ball, or the like. A structure may be installed on the one end 25a of the support rod 25. In this case, since a weight of the structure is large, an excessive weight may be applied to the upper plate 16a of the floating part 16. Accordingly, since the upper plate 16a may be damaged, the base unit 30 serves to disperse some of the weight applied to the support rod 25 to the lower plate 16b.

The solar panel 35 is installed on the upper plate 16a of the floating part 16. Accordingly, the floating-type on-water support apparatus according to the present embodiment may be self-powered. In the case of the present embodiment, the solar panel 35 is installed on the upper plate of the floating part 16, but a vertical wind power generator may be installed instead of the solar panel 35, or both of the vertical wind power generator and the solar panel 35 may be installed thereon. The solar panel 35 and the vertical wind power generator may also be installed on any embodiment which will be described below.

When the floating-type on-water support apparatus according to the present embodiment is installed on the sea, the support rod 25 stands vertically, and the one end 25a is moved upward from the sea and the other end is accommodated in the floating part 16. In this case, the wind power generator or the like is installed on the one end 25a of the support rod 25. Even when a structure or the like is installed on the support rod 25 so that the support rod 25 is heavy, since the base unit 30 is installed on the other end of the support rod 25, the support rod 25 is supported by the lower plate 16b of the floating part 16. Accordingly, since the weight of the support rod 25 is dispersed to the upper plate 16a and the lower plate 16b, damage to the upper plate 16a of the floating part 16 due to an excessive weight may be prevented. In addition, since the lower plate 16b of the support rod 25 incudes the spherical surface portion 16c, distances from the center of the ball 10 to the spherical surface portion 16c are the same.

Figure 5A:
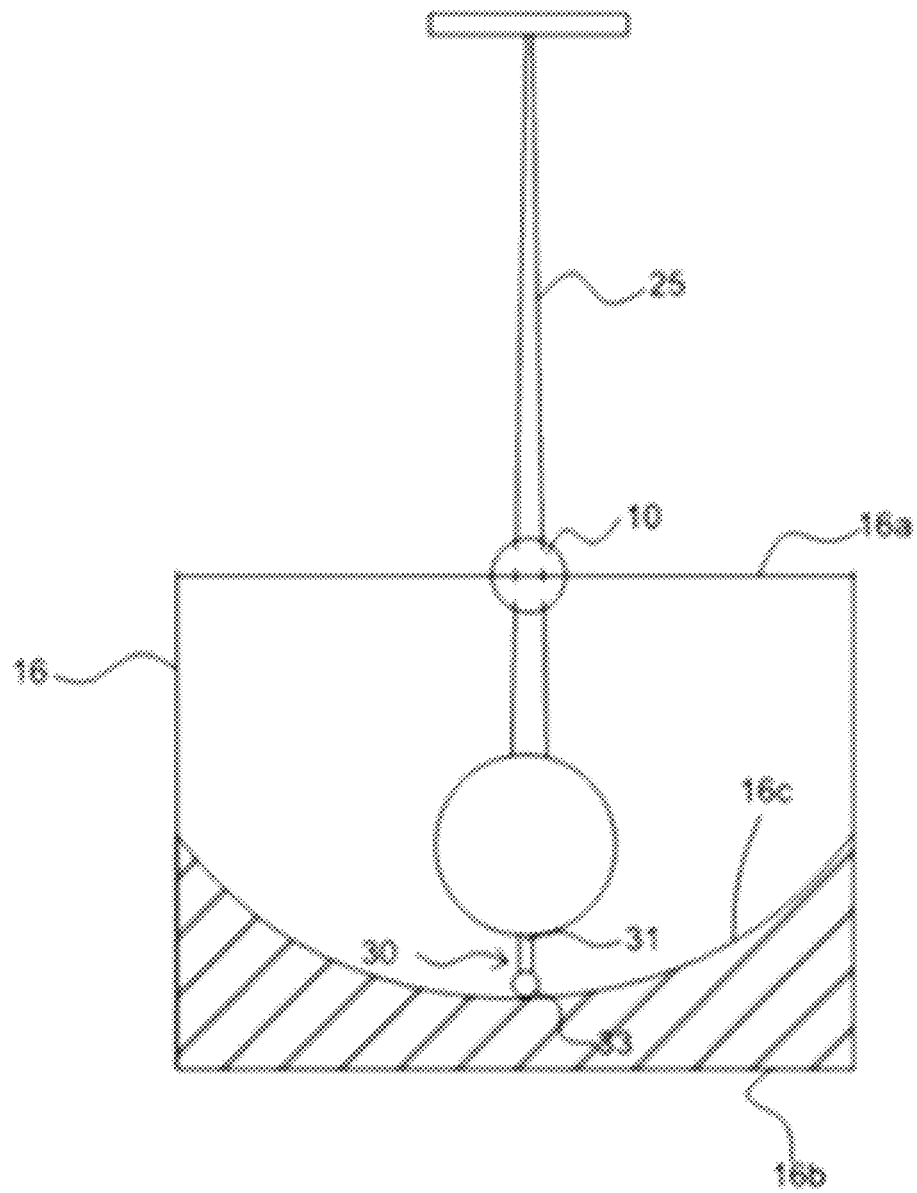
FIGS. 5A and 5B are operational views illustrating the embodiment of FIG. 1.
Figure 5B:
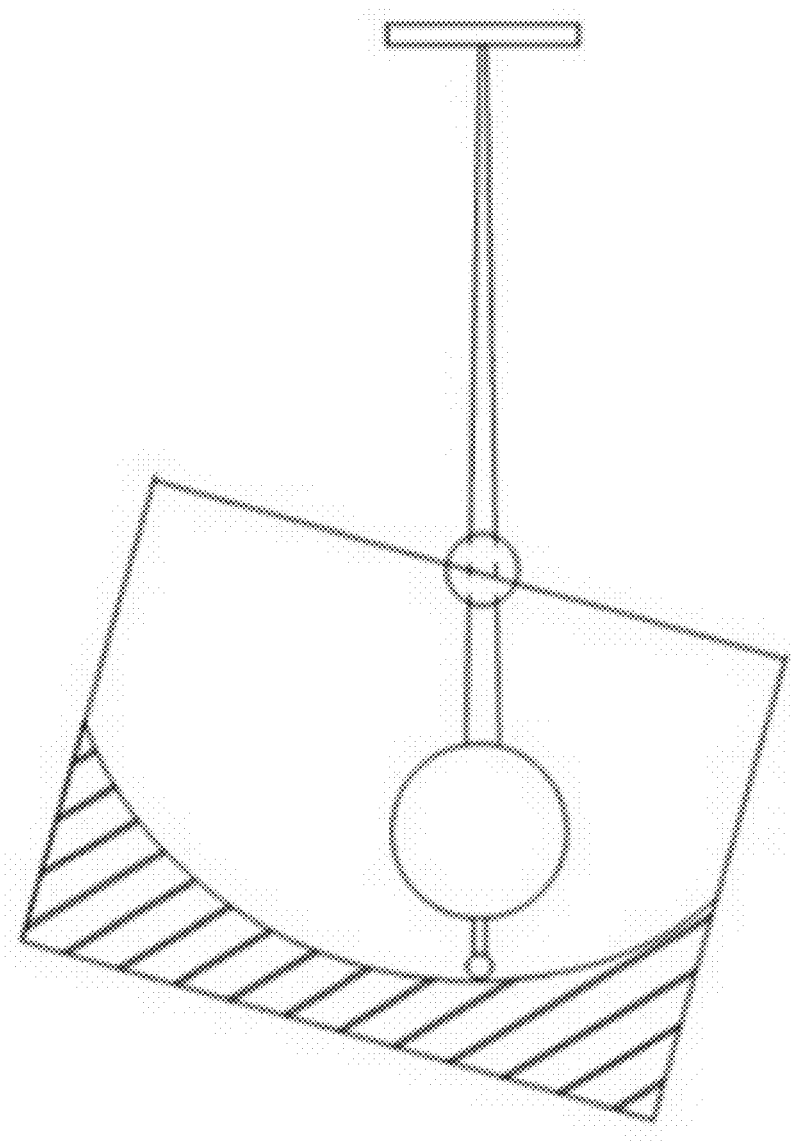

In addition, the base unit 30 is in contact with the spherical surface portion 16c to be rollable on the spherical surface portion 16c. Accordingly, although the base unit 30 is in contact with the spherical surface portion 16c, as a frictional force is minimized, the floating part 16 may be shaken with respect to the support rod 25, and as illustrated in FIGS. 5A and 5B, even when the floating part 16 or the support rod 25 are shaken, the base unit 30 is supported by the spherical surface portion 16c.

Meanwhile, in the case of the present embodiment, since the other end of the support rod 25 is inserted into the floating part 16, the support rod 25 is not affected by a wave. That is, even when the wave hits the support rod 25, the floating part 16 is shaken but the support rod 25 is prevented from being shaken.

In addition, when the restriction protrusion 17 is rotated and fitted into the guide groove 11 of the ball 10, the ball 10 is prevented from being rotated about the axis of the support rod 25. However, the ball 10 is restricted from being rotated about the axis of the support rod 25 but may be rotated about an axis perpendicular to the axis of the support rod 25. Accordingly, even when a wave hits and shakes the floating part 16, the shaking of the floating part 16 is not transferred to the support rod 25.

However, in this case, the moving plate 21, on which the restriction protrusion 17 is installed, may slide the predetermined distance. Accordingly, the support rod 25 may be shaken about the axis of the support rod 25 within the predetermined distance. When a strong wind blows to rotate the support rod 25 in an axis direction thereof, an excessive load is applied to the restriction protrusion 17, and thus the restriction protrusion 17 or the ball 10 may be damaged. In this case, the moving plate 21 coupled to the restriction protrusion 17 may slide to reduce the impact. When the moving plate 21 positioned at one side slides, the moving plates 21 positioned at both sides of the hall 10 slide in the same direction. In addition, the moving plates 21 slide in the circumferential direction of the ball 10. Accordingly, even when the moving plates 21 slide, a predetermined distance between the restriction protrusions 17 positioned at both sides of the ball 10 is maintained. Accordingly, the restriction protrusions 17 are not separated from the guide groove 11 of the ball.

According to the present embodiment, since the guide groove 11 is formed in the ball 10 and the restriction protrusion 17 is fitted into the guide groove 11, rotation about the axis of the support rod 25 may be restricted. Accordingly, in a case in which the wind power generator or the like is installed on the support rod 25, rotation of a shaft of the wind power generator due to wind may be prevented. However, in this case, the shaft of the wind power generator may be rotated within the predetermined distance within which the moving plate 21 is moved in the circumferential direction of the ball 10.

In addition, in some cases, when the restriction protrusion 17 is rotated to be moved further forward, the restriction protrusion 17 is rotated and fitted into the fixing groove 13. In this case, the ball 10 may be restricted form being rotated in the other direction and may be rotated about an axis of the restriction protrusion 17.

Figure 6:
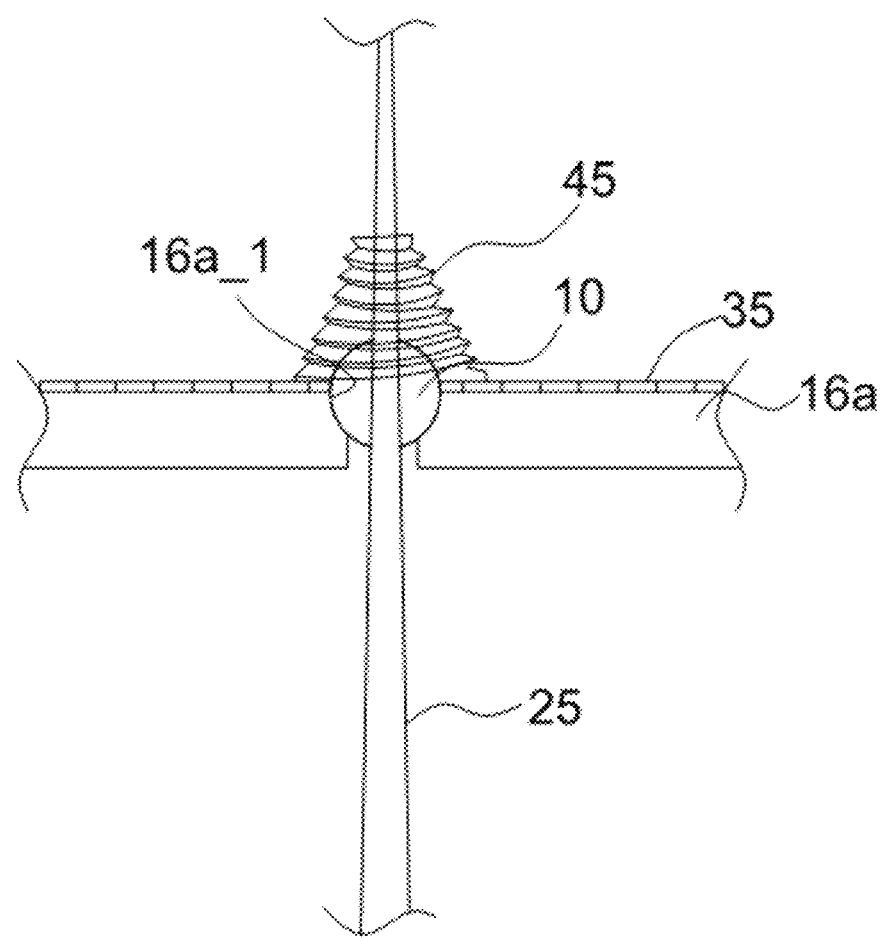
FIG. 6 is a conceptual view illustrating a floating-type on-water support apparatus according to another embodiment of the present invention.

FIG. 6 is a view illustrating a floating-type on-water support apparatus according to another embodiment of the present invention. The embodiment of FIG. 6 further includes blocking covers 45 in addition to the embodiment of FIG. 1. The blocking covers 45 are installed on a floating part 16 to prevent water from being introduced into a ball 10. The blocking covers 45 are formed of a flexible material to be deformed when the floating part 16 is shaken.

Figure 7:
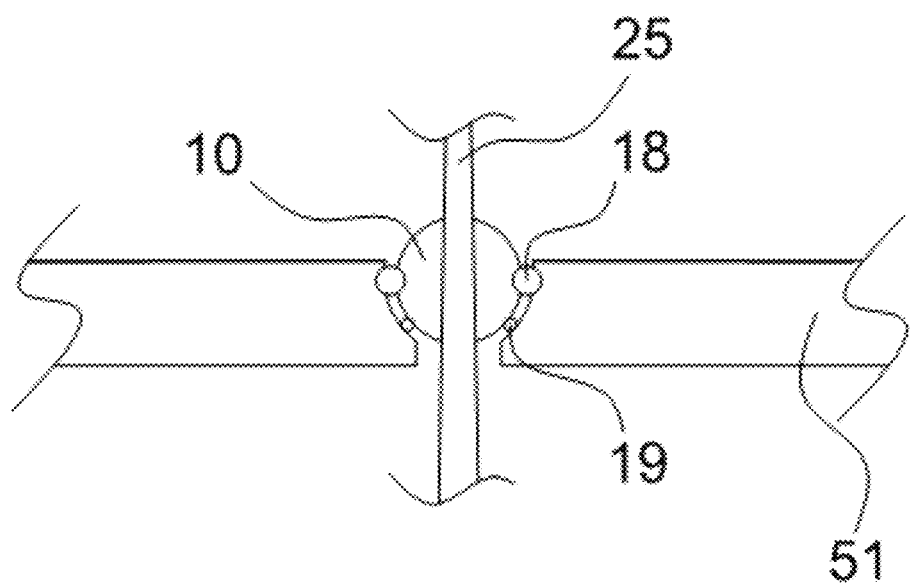
FIG. 7 is a conceptual view illustrating a floating-type on-water support apparatus according to still another embodiment of the present invention.

FIG. 7 is a view illustrating a floating-type on-water support apparatus according to still another embodiment of the present invention.

The embodiment of FIGS. 1 to 4 includes the restriction protrusion 17 and the fixing member 20 for restricting rotation of the ball 10. In the embodiment of FIG. 7, a restriction protrusion 18 is formed as a ball type to restrict rotation of a ball 10 and fitted into a guide groove 11. In this case, the ball 10 does not need a fixing groove 13, and a groove capable of accommodating the restriction protrusion 18 is formed in a floating part 16. Since the restriction protrusion 18 is accommodated in the floating part 16, a fixing member 20 is also not needed. Meanwhile, in order to reduce friction between the ball 10 and the floating part 16, a bearing 19 supporting the ball 10 may be installed in the floating part 16.

Figure 8:
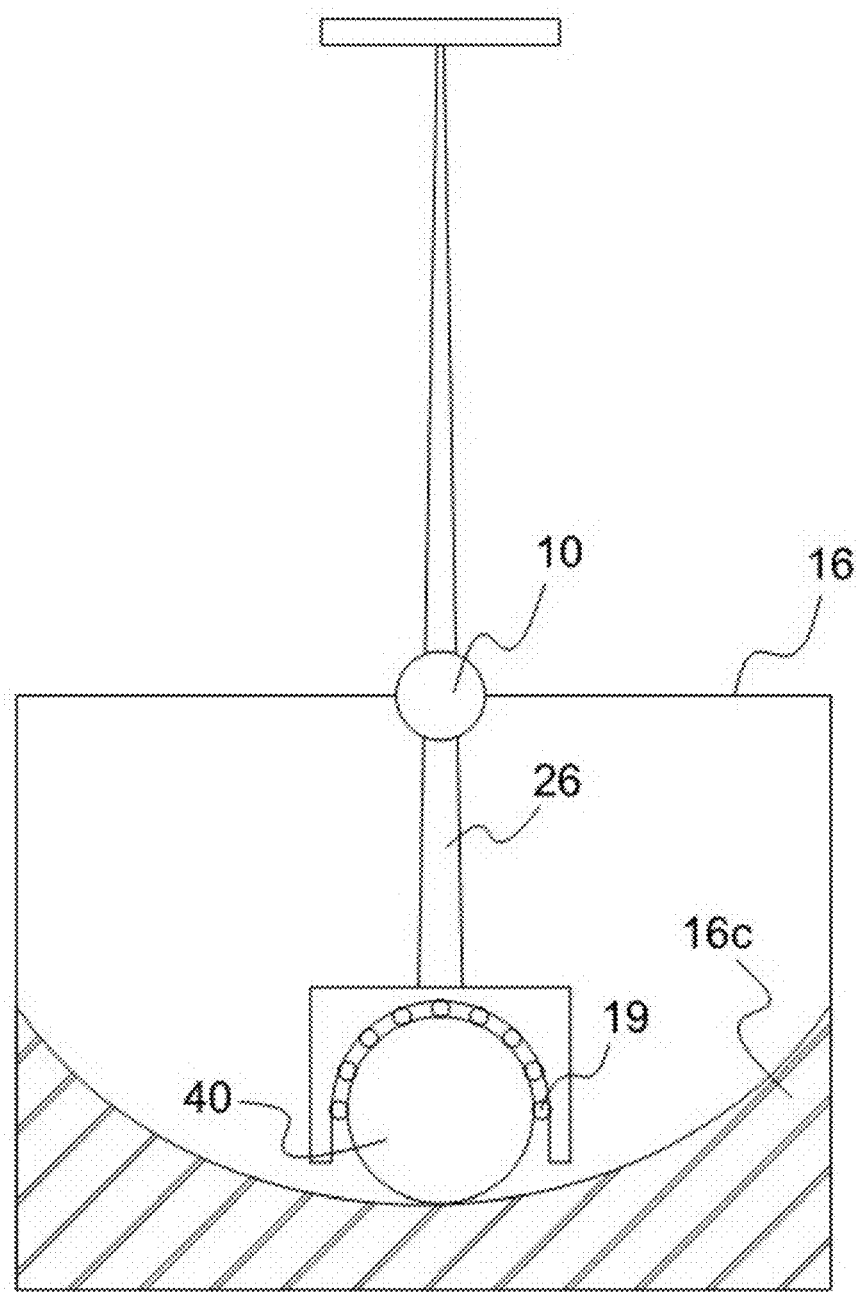
FIG. 8 is a conceptual view illustrating a floating-type on-water support apparatus according to yet another embodiment of the present invention.

FIG. 8 is a view illustrating a floating-type on-water support apparatus according to yet another embodiment of the present invention.

The floating-type on-water support apparatus according to FIG. 8 includes a hall 10, a floating unit, a support rod 26, and a center pendulum 40. The ball 10 and the floating unit are the same as those of the embodiment illustrated in FIGS. 1 to 5. Accordingly, the floating nit includes a floating part 15, and the ball 10 may be restricted in the floating part 15 by a restriction protrusion 17 and a fixing member 20 as in FIG. 1 or by a restriction protrusion 18 as in FIG. 7.

The support rod 26 is coupled to the ball 10 so that one end thereof is exposed from the floating part 16 to the outside, and the other end thereof is accommodated in the floating part 16 like the embodiment illustrated in FIG. 1. A structure such as a wind power generator or the like may be installed on one end of the support rod 26. In this case, a groove may be formed in the other end of the support rod 26 to surround an upper portion of the center pendulum 40 so that the center pendulum 40 is not separated from the support rod 26. In addition, the groove of the other end of the support rod 26 is formed to have a spherical surface to be supported by the center pendulum 40.

The center pendulum 40 serves to stand the support rod 26 vertically. To this end, the center pendulum 40 is disposed on a spherical surface portion 16c of the floating part 16 to be rollable and positioned in the groove of the support rod 26 to support the support rod 26. In this case, since the center pendulum 40 supports the support rod 26 using bearings 19, friction between the center pendulum 40 and the support rod 26 may be minimized. Since the center pendulum 40 may roll on the spherical surface portion 16c, the center pendulum 40 always tries to be positioned at the lowest point of the spherical surface portion 16c. When the support rod 26 is inclined, since the center pendulum 40 is restricted by the support rod 26, the center pendulum 40 is moved upward. However, since the center pendulum 40 is moved to the lowest point of the spherical surface portion 16c due to a weight of the center pendulum 40 and the center pendulum 40 presses the support rod 26, the support rod 26 stands. Accordingly, the support rod 26 always tries to stand vertically due to the center pendulum 40.

Figure 9:
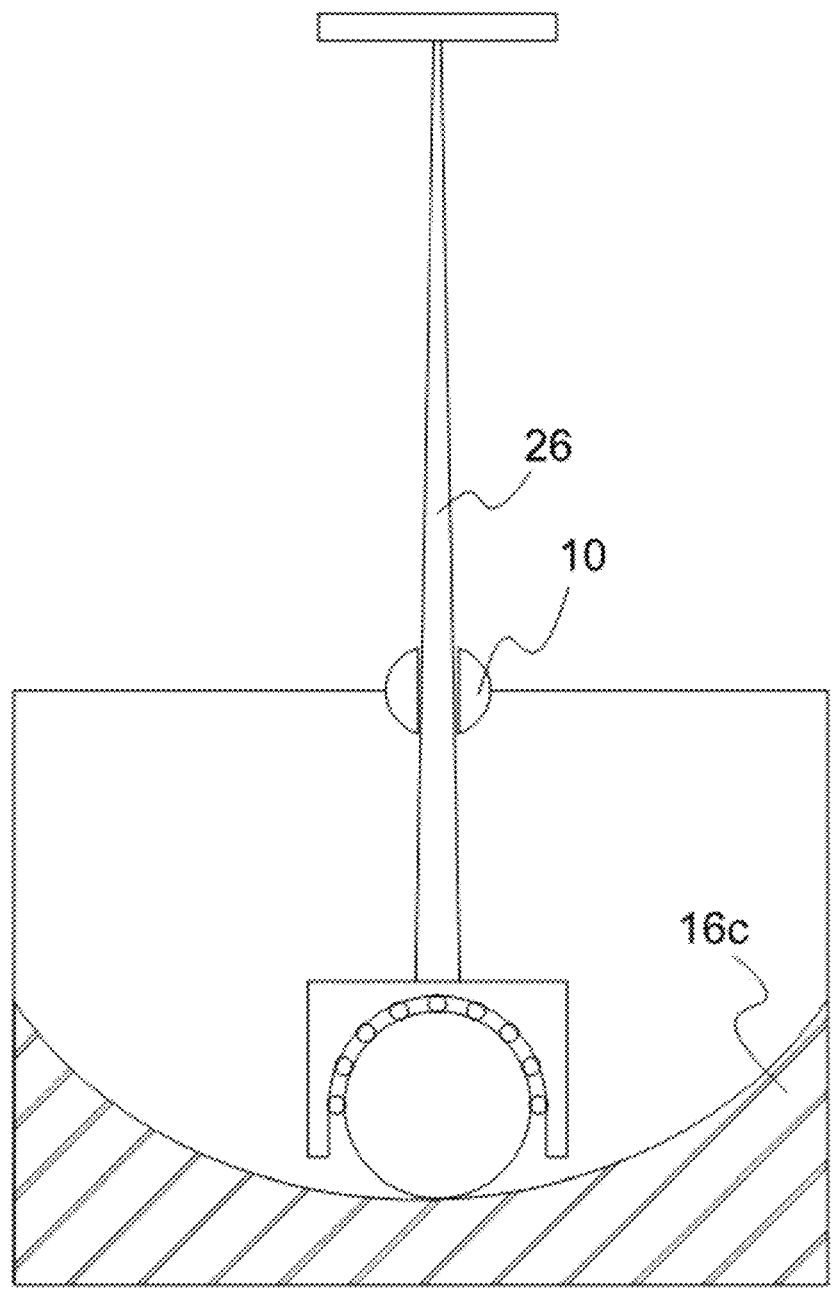
FIG. 9 is a conceptual view illustrating a floating-type on-water support apparatus according to yet another embodiment of the present invention.

FIG. 9 is a view illustrating a floating-type on-water support apparatus according to yet another embodiment of the present invention.

In the embodiment of FIG. 9, a support rod 26 passes through and is slidably installed in a ball 10 in addition to the embodiment of FIG. 8. In the embodiments of FIGS. 1 to 8, the center of the ball 10 matches with a center of the spherical surface portion 16c of the floating part 16, but in the embodiment of FIG. 9, a center of the ball 10 does not need to match with a center of a spherical surface portion 16c.

Figure 10:
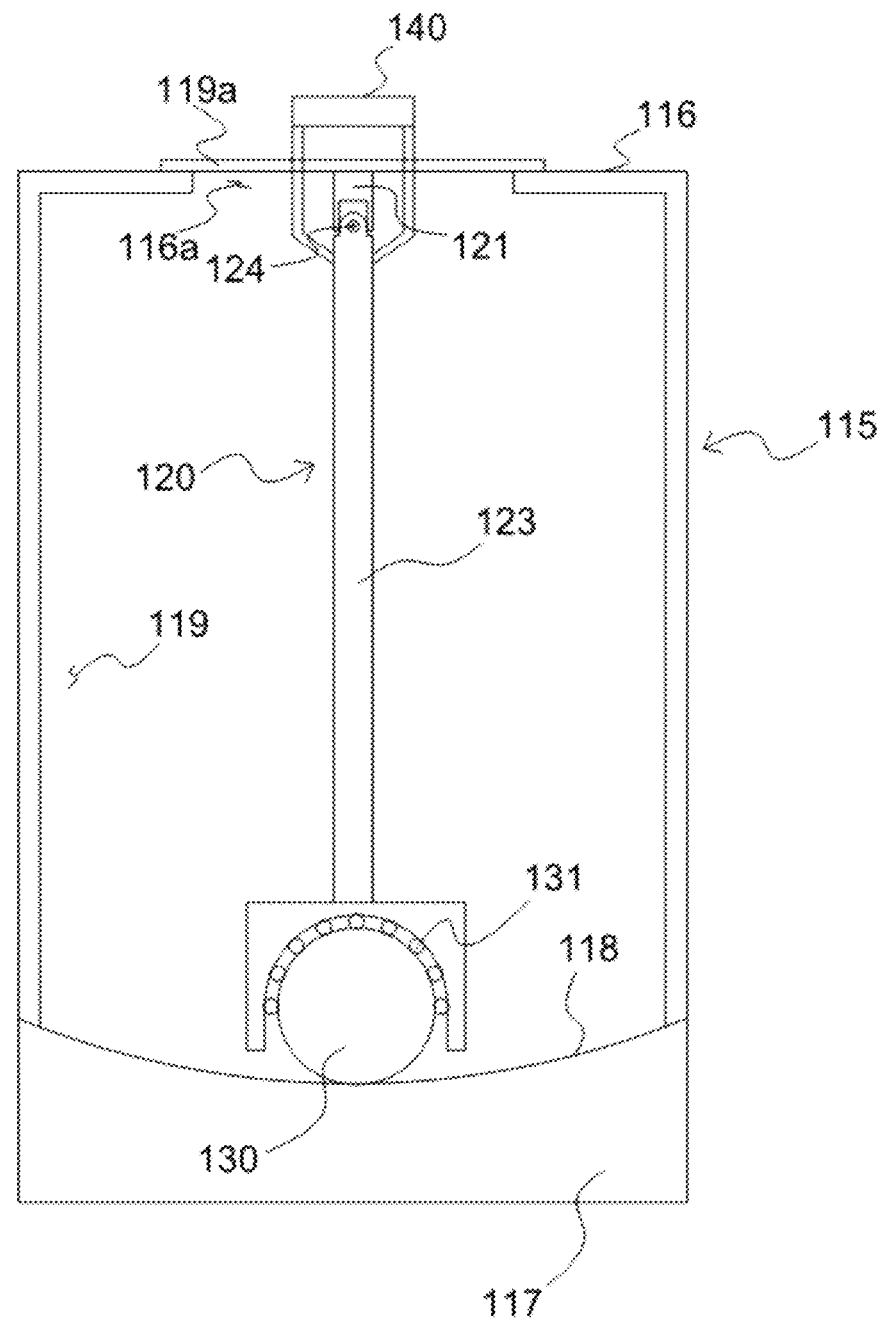
FIG. 10 is a conceptual view illustrating a floating-type on-water support apparatus according to yet another embodiment of the present invention.
Figure 11:
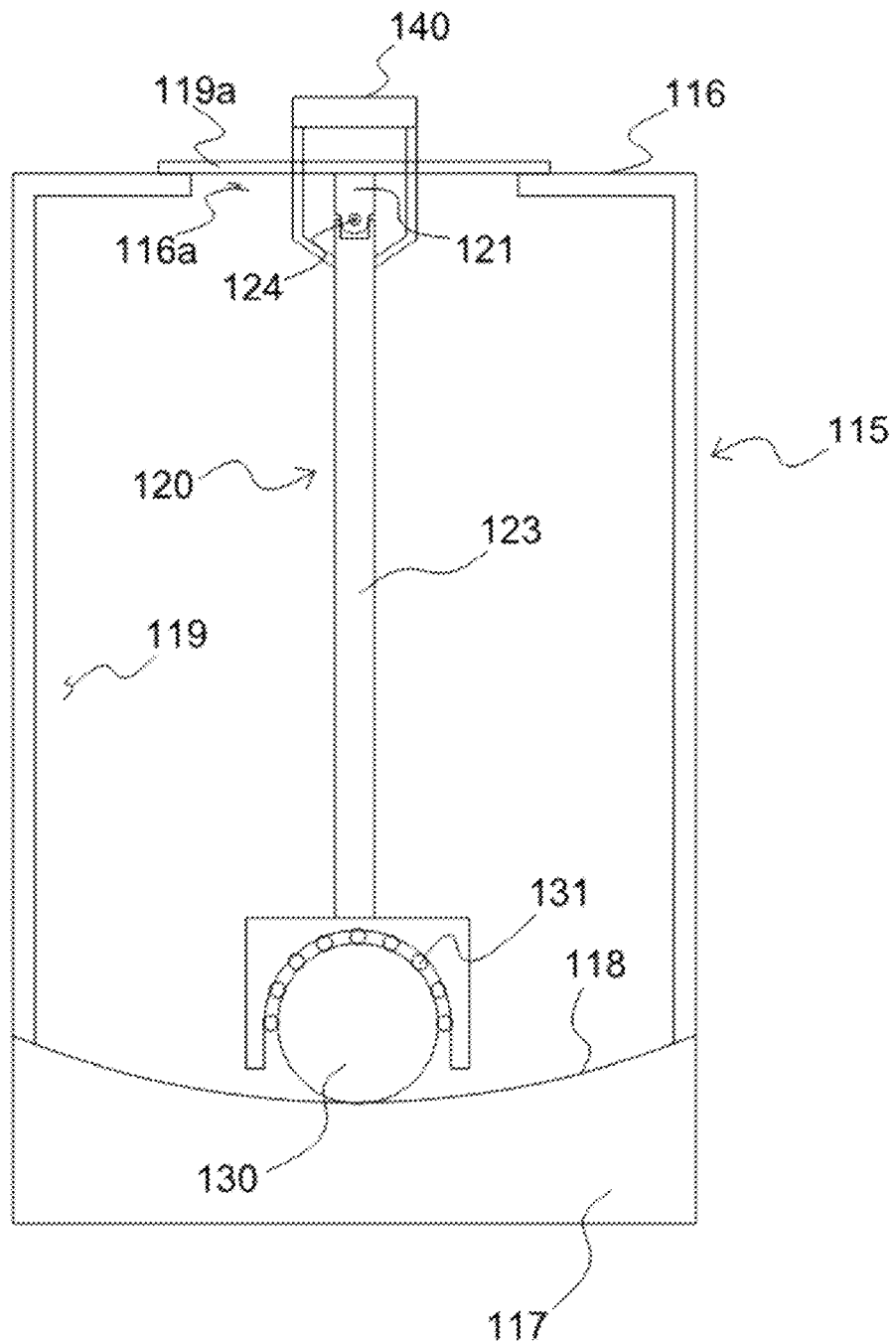
FIG. 11 is a cross-sectional view illustrating the embodiment of FIG. 10 when viewed from the side.
Figure 12:
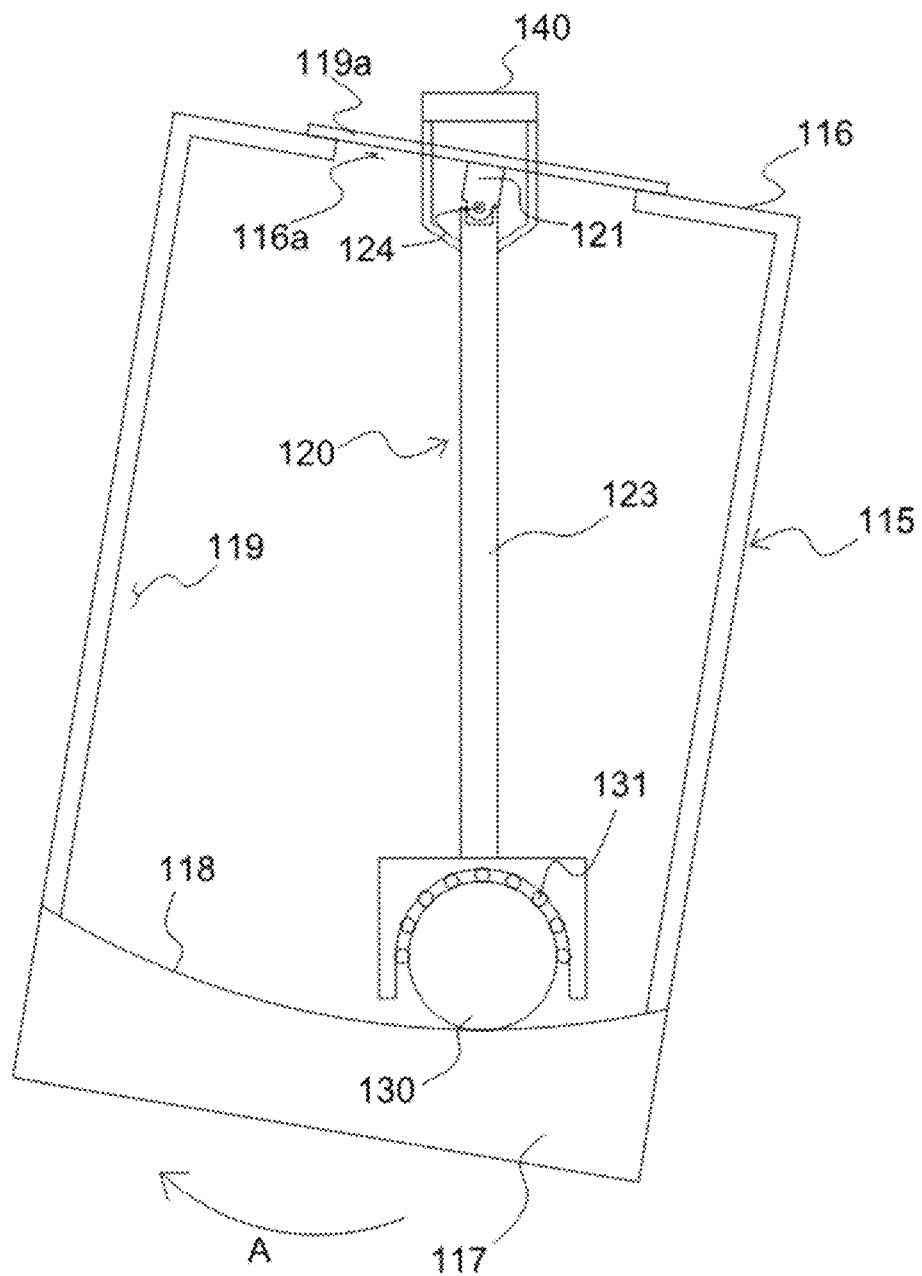
FIG. 12 is an operational view illustrating the embodiment of FIG. 10.

FIGS. 10 to 12 are views illustrating a floating-type on-water support apparatus according to another embodiment of the present invention. The floating-type on-water support apparatus according to another embodiment will be described with reference to FIGS. 10 to 12.

The floating-type on-water support apparatus according to the present invention includes a floating unit, a support unit 120, a center pendulum 130, and an installation base 140.

The floating unit includes a floating part 115, and like the above-described embodiment, an accommodation part 119 is formed in the floating part 115, and a spherical surface portion 118 is formed on a lower surface 117. However, a through hole 116a is formed in an upper portion 116 so that an installation base 140 passes therethrough.

The support unit 120 includes an upper support rod 121 and a lower support rod 123 and is installed in the accommodation part 119 of the floating part 115. The upper support rod 121 is coupled to the upper portion 116 of the floating part 115. To this end, an upper end of the upper support rod 121 is formed as a support plate 119a and is coupled to the upper portion 116 so that the support plate 119a is disposed across the through hole 116a. An upper end of the lower support rod 123 is coupled to a lower end of the upper support rod 121 using a universal joint 124. Accordingly, the upper support rod 121 may be rotated in front, rear, left, and right directions with respect to the lower support rod 123. A groove is formed in a lower portion of the lower support rod 123 to surround an upper portion of the center pendulum 130 so that the center pendulum 130 is not separated from the lower support rod 123. In this case, the lower portion of the lower support rod 123 is formed to have a spherical surface so as to be supported by the center pendulum 130.

The center pendulum 130 serves to stand the lower support rod 123 up vertically. To this end, the center pendulum 130 is disposed on a spherical surface portion 118 of the floating part 115 to be rollable and positioned in the groove of the lower support rod 123 to support the lower support rod 123. In this case, since the center pendulum 130 supports the lower support rod 123 using bearings 131, friction between the center pendulum 130 and the lower support rod 123 may be minimized. Since the center pendulum 130 may be rollable on the spherical surface portion 118, the center pendulum 130 always tries to be positioned at the lowest point of the spherical surface portion 118. In a case in which the lower support rod 123 is inclined, since the center pendulum 130 is restricted by the lower support rod 123, the center pendulum 130 is moved upward. However, since the center pendulum 130 is moved to the lowest point of the spherical surface portion 118 due t) a weight of the center pendulum 130 and the center pendulum 130 presses the lower support rod 123, the lower support rod 123 stands. Accordingly, the lower support rod 123 always tries to stand vertically due to the center pendulum 130.

The installation base 140 is exposed above the floating unit so that a structure such as a wind power generator is installed thereon, passes through the through hole 116*a* of the floating part 115, and is coupled to the lower support rod 123. Accordingly, since the installation base 140 is integrally coupled to the lower support rod 123, an angle, which is the same as an angle of the lower support rod 123, of the installation base 140 is maintained. Accordingly, when the lower support rod 123 stands, the installation base 140 also stands. When the structure is installed on the installation base 140, some of a load applied to the installation base 140 is transferred to an upper portion 116 of the floating part 115, and the remaining load is supported by the center pendulum 130. Accordingly, even in the case of the present embodiment, the load of the structure is dispersed to the upper and lower portions of the floating part 115.

In the case of the present embodiment, since the upper support rod 121 is coupled to the lower support rod 123 using the universal joint 124, the upper support rod 121 is rotatable in the front and rear or left and right directions with respect to the lower support rod 123. Accordingly, when a wave hits the floating part 115, as illustrated in FIG. 12, the floating part 115 is shaken in the front and rear or left and right directions. Even when the floating part 115 is shaken in the front and rear or left and right directions, the center pendulum 130 is positioned at the lowest point of the spherical surface portion 118 due to the weight thereof. Since the center pendulum 130 is restricted by the lower support rod 123, the lower support rod 123 is not shaken in the front and rear or left and right directions and stands vertically. Accordingly, even the case of the present embodiment, since the installation base 140 stands vertically, when the wind power generator is installed on the installation base 140, the wind power generator may be maintained vertically regardless of a wave.

Figure 13:
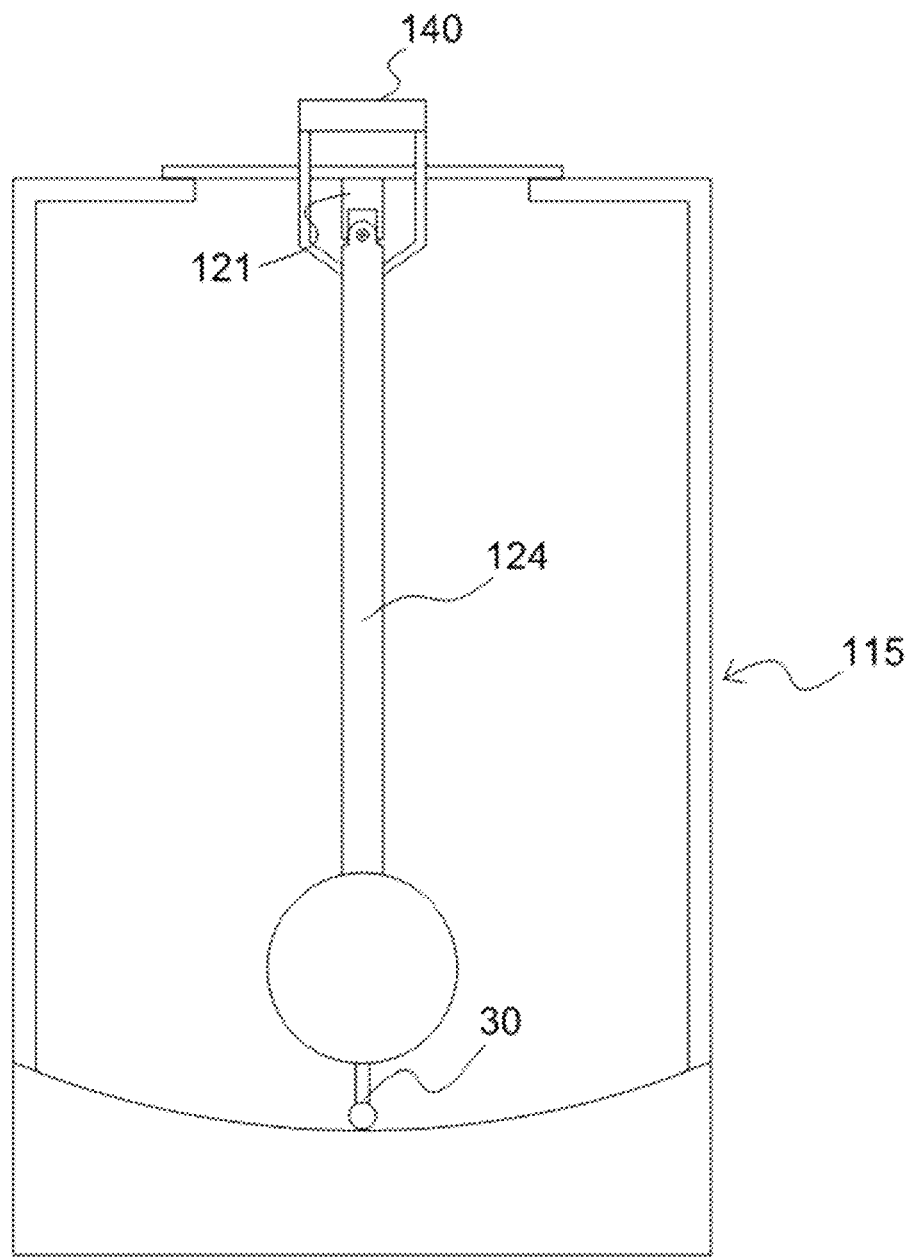
FIG. 13 is to conceptual view illustrating a floating-type on-water support apparatus according to yet another embodiment of the present invention.

FIG. 13 is a view illustrating a floating-type on-water support apparatus according to yet another embodiment of the present invention;

The floating-type on-water support apparatus illustrated in FIG. 13 incudes a floating unit, a support unit 120, a base unit 30, and an installation base 140.

The floating unit is the same as that of the embodiment illustrated in FIG. 10 and includes a floating part 115. The support unit 120 includes an upper support rod 121 and a lower support rod 124. Although the upper support rod 121 and the lower support rod 124 are coupled using a universal joint like the embodiment illustrated in FIG. 10, in the case of the present embodiment, a lower end of the lower support rod 124 is formed to be lighter than an upper end thereof like the support rod 25 of the embodiment illustrated in FIG. 1. Accordingly, the lower support rod 124 stands vertically due to a weight thereof. The base unit 30 is in roll contact with a spherical surface portion of the floating part 115 to support the lower support rod 124 like the embodiment illustrated in FIG. 1.

The installation base 140 is the same is that of the embodiment illustrated in FIG. 10.

Accordingly, in the case of the present embodiment, even when the floating pan 115 shakes in from and rear or left and right directions, the lower support rod 124 may stand vertically due to a weight thereof, and a load applied to the installation base 140 may be dispersed to upper and lower portions of the floating pan 115.

Figure 14:
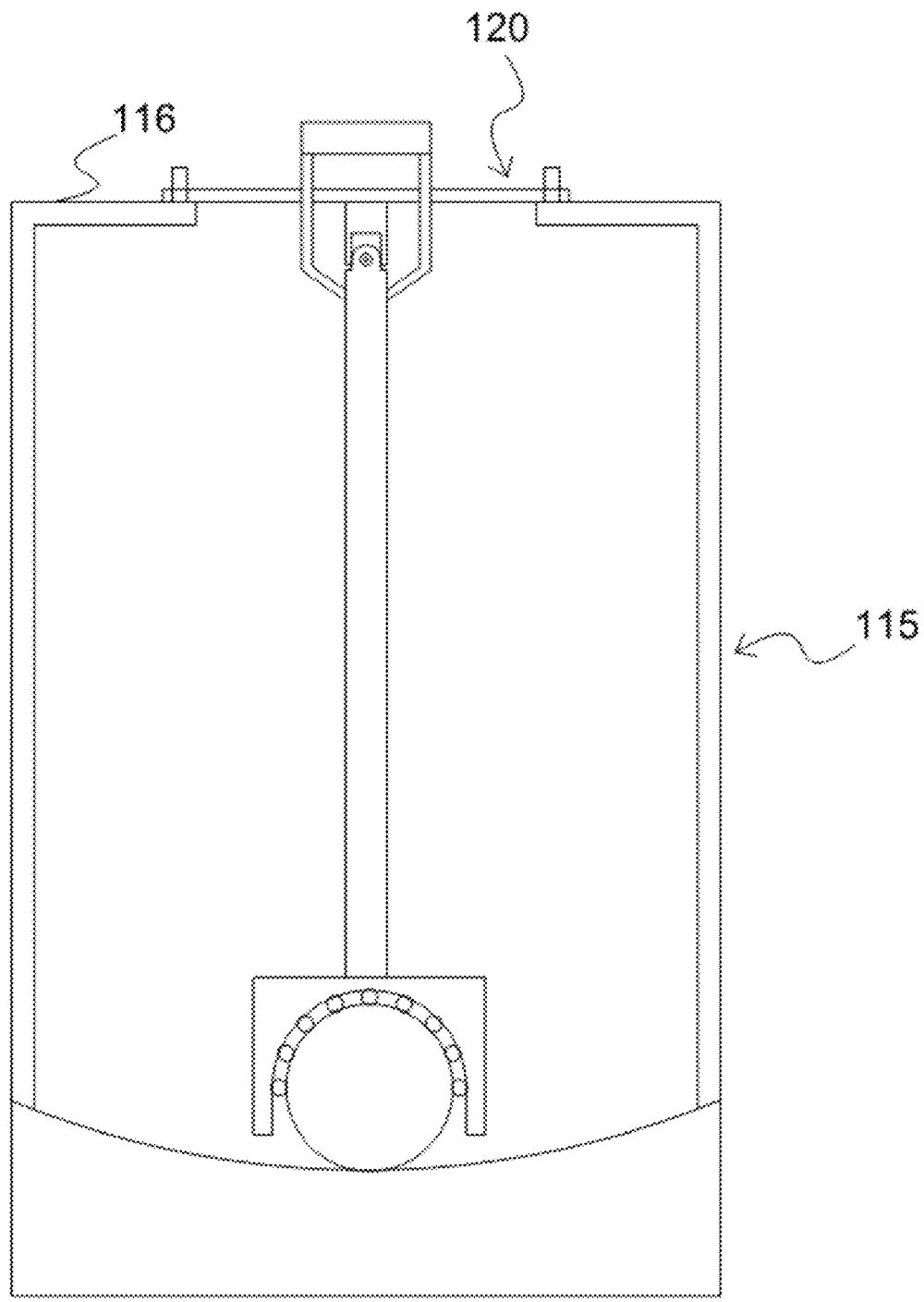
FIG. 14 is a conceptual view illustrating a floating-type on-water support apparatus according to yet another embodiment of the present invention.

FIG. 14 is a view illustrating a floating-type on-water support apparatus according to yet another embodiment of the present invention.

In the embodiment illustrated in FIG. 14, a support unit 120 may vertically slide on an upper portion 116 of a floating part 115 in addition to the embodiment illustrated in FIG. 10. To this end, the floating part 115 includes a guide 114 disposed on the upper portion 116, and an upper support rod 121 is installed to be vertically slidable along the guide 114. That is, in the embodiment illustrated in FIG. 10, the upper support rod 121 is fixedly coupled to the upper portion 116 of the floating part 115, but in the case of the present embodiment, the upper support rod 121 is loaded on the upper portion 116 of the floating pan 115, and the guide 114 restricts the upper support rod 121 to only slide vertically.

According to the present invention, a base unit supports a support rod from a lower plate of a floating part. Accordingly, since the support rod is supported on an upper plate and the lower plate of the floating part, an excessive load is prevented from being applied to the upper plate.

Since a restriction protrusion is fitted into a guide groove of a ball, the support rod coupled to the ball may be prevented from being rotated about a central axis thereof. Accordingly, when a wind power generator is installed on the support rod, rotation of a shall of the wind power generator due to wind can be prevented.

In addition, a moving plate can slide a predetermined distance on a fixing frame. In this case, when a load which rotates the support rod about an axis thereof is large, since some of the load can be absorbed, the restriction protrusion or the ball can be prevented from being damaged due to the excessive load.

What is claimed is:

1. A floating-type on-water support apparatus comprising:
   a ball;
   a floating unit including a floating part, wherein the floating part has an upper plate supporting the ball so that the ball is rotatable, an interior formed to be hollow, and a lower plate provided with a spherical surface portion and floats on water;
   a support rod coupled to the ball and having one end exposed above the water so that a structure is installable thereon and the other end heavier than the one end so as to stand vertically to be accommodated in the floating part; and
   a base unit having one end installed on a lower portion of the support rod to support the support rod and the other end in roll contact with the spherical surface portion.

2. A floating-type on-water support apparatus comprising:
   a ball;
   a floating unit including a floating pan, wherein the floating part has an upper plate supporting the ball so that the ball is rotatable, an interior formed to be hollow, and a lower plate provided with a spherical surface portion and floats on water;
   a support rod having one end exposed above the water so that a structure is installable thereon and the other end coupled to the ball to stand vertically to be accommodated in the floating part; and a center pendulum positioned to be rolled on the spherical surface portion to press a lower end of the support rod so as to allow the support rod to stand.

3. The floating-type on-water support apparatus of claim 2, wherein the lower end of the support rod surrounds an upper portion of the center pendulum so that the center pendulum is not separated from the support rod.

4. The floating-type on-water support apparatus of claim 3, wherein the support rod is supported by the center pendulum using a bearing.

5. The floating-type on-water support apparatus of any one of claim 1, wherein the support rod is slidably coupled to pass through the ball.

6. The floating-type on-water support apparatus of claim 5, wherein:
- a guide groove is formed in the ball along a circumferential surface passing through the support rod; and
- the floating unit further includes a restriction protrusion fitted into the guide groove to restrict rotation of the ball about an axis of the support rod.

7. A floating-type on-water support apparatus comprising:
- a floating unit including a floating part of which an interior is formed to be hollow so that the floating part floats on water and in which a spherical surface portion is formed on a lower surface in the interior;
- a support unit accommodated in the floating part and including an upper support rod coupled to an upper portion of the floating part and a lower support rod having one end coupled to the upper support rod using a universal joint and the other end heavier than the one end to stand vertically;
- a base unit having one end installed on the other end of the lower support rod to support the lower support rod and the other end in roll contact with the spherical surface portion; and
- an installation base exposed above the floating unit so that a structure is installable on one end thereof and coupled to the lower support rod.

8. A floating-type on-water support apparatus comprising:
- a floating unit including a floating part of which an interior is formed to be hollow so that the floating part floats on water and in which a spherical surface portion is formed on a lower surface in the interior;
- a support unit accommodated in the floating part and having an upper support rod coupled to an upper portion of the floating part and a lower support rod coupled to the upper support rod using a universal joint;
- a center pendulum positioned to be rolled on the spherical surface portion to press a lower end of the lower support rod so as to allow the lower support rod to stand; and
- an installation base exposed above the floating unit so that a structure is installed one end thereof and coupled to the lower support rod.

9. The floating-type on-water support apparatus of claim 8, wherein the lower support rod surrounds an upper portion of the center pendulum so that the center pendulum is not separated from the lower support rod.

10. The floating-type on-water support apparatus of claim 9, wherein the lower support rod is supported by the center pendulum using a bearing.

11. The floating-type on-water support apparatus of any one of claim 7, wherein the upper support rod is coupled to an upper portion of the floating part to be vertically slidable.

12. The floating-type on-water support apparatus of any one of claim 2, wherein the support rod is slidably coupled to pass through the ball.

13. The floating-type on-water support apparatus of any one of claim 8, wherein the upper support rod is coupled to an upper portion of the floating part to be vertically slidable.

* * * * *